United States Patent
Flügel

(10) Patent No.: US 11,126,449 B2
(45) Date of Patent: Sep. 21, 2021

(54) CONTENT ADAPTIVE SIGNAL PROBING IN HARDWARE EMULATION DEVICES

(71) Applicant: PRO DESIGN ELECTRONIC GMBH, Bruckmühl (DE)

(72) Inventor: Sebastian Flügel, Ottobrunn (DE)

(73) Assignee: PRO DESIGN ELECTRONIC GMBH, Bruckmühl (DE)

( * ) Notice: Subject to any disclaimer, the term of this patent is extended or adjusted under 35 U.S.C. 154(b) by 425 days.

(21) Appl. No.: 15/550,769

(22) PCT Filed: Feb. 12, 2015

(86) PCT No.: PCT/EP2015/052935
§ 371 (c)(1),
(2) Date: Aug. 11, 2017

(87) PCT Pub. No.: WO2016/128050
PCT Pub. Date: Aug. 18, 2016

(65) Prior Publication Data
US 2018/0239623 A1    Aug. 23, 2018

(51) Int. Cl.
*G06F 9/455*    (2018.01)
*G06F 11/26*    (2006.01)
(Continued)

(52) U.S. Cl.
CPC ........ *G06F 9/45504* (2013.01); *G06F 11/261* (2013.01); *G06F 11/3024* (2013.01); *G06F 11/3409* (2013.01); *G06F 2201/835* (2013.01)

(58) Field of Classification Search
CPC ............. G06F 9/45504; G06F 11/261; G06F 11/3024; G06F 11/3409; G06F 2201/835
(Continued)

(56) References Cited

U.S. PATENT DOCUMENTS 5,630,048 A * 5/1997 La Joie ................. G06F 11/25
714/25
5,905,732 A * 5/1999 Fimoff .............. H04N 21/23608
370/516

(Continued)

FOREIGN PATENT DOCUMENTS

| CA | 2340804 A1 * | 9/2002 | ............... G11C 7/22 |
| GB | 2404753 | 2/2005 | |

(Continued)

OTHER PUBLICATIONS

Ickes_2004 (L7: Memory Basics and Timing, Spring 2004 Digital Integrated Circuits: A Design Perspective, Prentice Hall, 2003 Chapter 10) (Year: 2003).*

(Continued)

*Primary Examiner* — Brian S Cook
(74) *Attorney, Agent, or Firm* — Hunton Andrews Kurth LLP

(57) ABSTRACT

Method, computer program stored on a computer-accessible medium and signal probing device can be provided for recording signal values of a first signal generated by an emulated digital circuit which can be emulated by a hardware emulation device. For example, the first signal can be read out, where the first signal comprises a plurality of data units. Furthermore, at least two signal values of the first signal can be stored. Each signal value of the first signal can only be stored, if a predetermined recording condition is fulfilled, such that a non-continuous set of signal values is stored in a data buffer. Moreover, at least one of the stored signal values can be marked with a flag, if the signal value is a boundary of a data unit of the first signal.

23 Claims, 6 Drawing Sheets

(51) Int. Cl.
*G06F 11/30* (2006.01)
*G06F 11/34* (2006.01)

(58) Field of Classification Search
USPC .......................................................... 703/32
See application file for complete search history.

(56) References Cited

U.S. PATENT DOCUMENTS

| | | | | |
|---|---|---|---|---|
| 2002/0191601 | A1* | 12/2002 | Cook | H04L 12/42 370/389 |
| 2006/0259529 | A1* | 11/2006 | Wood | G06F 15/8007 708/232 |
| 2008/0191733 | A1* | 8/2008 | Redgrave | H03K 19/1731 326/9 |
| 2011/0167311 | A1 | 7/2011 | Bailey et al. | |
| 2013/0055023 | A1* | 2/2013 | Chong | G06F 11/366 714/30 |
| 2015/0008957 | A1 | 1/2015 | Olgiati et al. | |

FOREIGN PATENT DOCUMENTS

WO WO 2011/019487 2/2011
WO WO-2011019487 A2 * 2/2011 .......... G06F 11/3648

OTHER PUBLICATIONS

IBM_1997 (Application Note Understanding Static RAM Operation, IBM Mar. 1997) (Year: 1997).*
ARM_2002 (Embedded Trace Buffer (Rev 0) Technical Reference Manual, ARM DDI 0242B 2002) (Year: 2002).*
Written Opinion for International Application No. PCT/EP2015/052935 dated Jan. 2015.
International Search Report for International Application No. PCT/EP2015/052935 dated Sep. 11, 2015.
Anonymous:"VHDL Online Help-Signal Declaration—vhdl.senerta.com" XP055220064 (Nov. 24, 2013); Ret. from Internet: URL:https://web.archive.org/web20131124002816/vhdl.renerta.com/.

* cited by examiner

PRIOR ART

| Record | Type | Signal_1 | Signal_2 | Bus_3 |
|---|---|---|---|---|
| 1 | first | timestamp = 100011 | | |
| 2 | probe | 0 | 1 | 01010111 |
| 3 | probe | 0 | 1 | 11011010 |
| 4 | last | timestamp = 100123 | | |
| ⋮ | ⋮ | ⋮ | ⋮ | ⋮ |
| N | probe | 1 | 0 | 11110000 |

Fig. 6

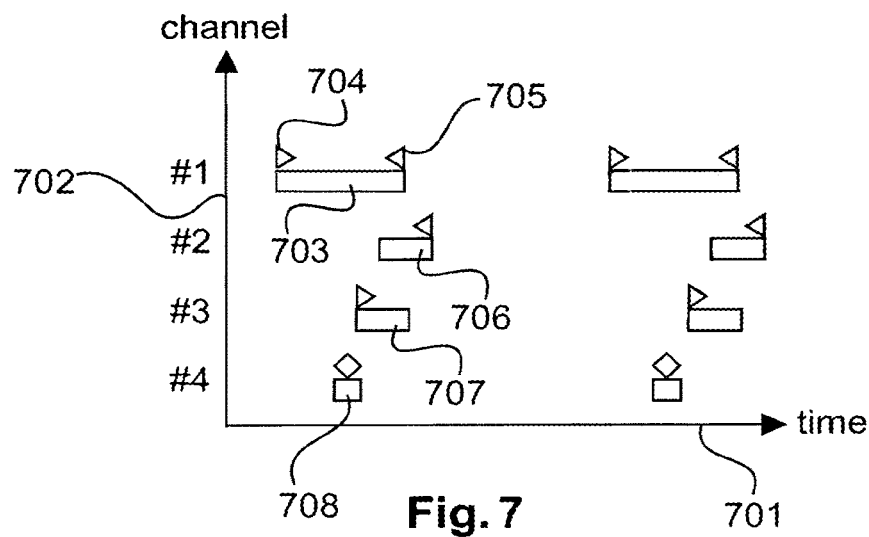
Fig. 7
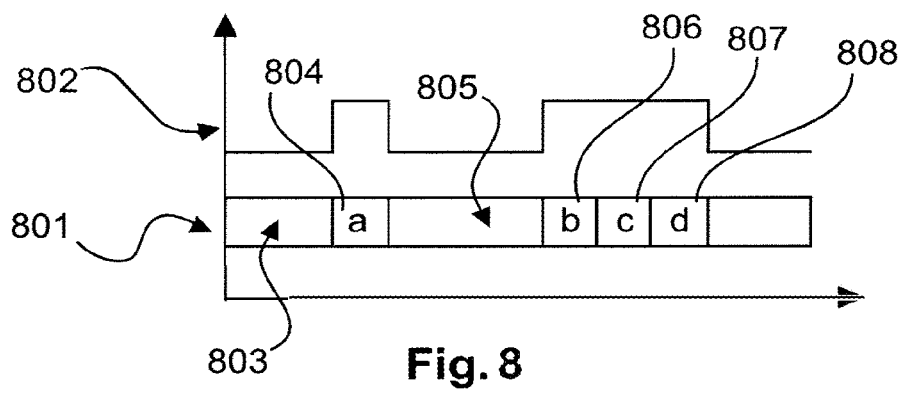
Fig. 8
| Record | Gap | Data |
|---|---|---|
| A | max | a |
| B | 3 | b |
| C | 0 | c |
| D | 0 | d |
Fig. 9

CONTENT ADAPTIVE SIGNAL PROBING IN HARDWARE EMULATION DEVICES

CROSS-REFERENCE TO RELATED APPLICATION(S)

The present application is a national phase of International Application No. PCT/EP2015/052935 filed on Feb. 12, 2015, which published as International Patent Publication WO 2016/128050 on Aug. 18, 2016, the entire disclosures of which are incorporated herein by reference.

FIELD OF THE DISCLOSURE

The present disclosure relates to signal probing in hardware emulation devices. In particular, the present disclosure relates to a method of recording signal values of a first signal generated by an emulated digital circuit emulated by a hardware emulation device, a program element and a signal probing device for recording signal values of a first signal generated by an emulated digital circuit emulated by a hardware emulation device.

BACKGROUND INFORMATION

Modern integrated circuits, for example application specific integrated circuits (ASIC), may have complex designs such that there is a need for a verification of such designs before the final realization of the integrated circuit. For the pre-silicon verification of such digital designs, hardware emulation by means of field programmable gate arrays (FPGA) is a key technology—which is also known as prototyping.

One challenge in prototyping is the limited visibility of internal states and logic transitions, which shall be generally denoted as signals. One existing approach is to use digital logical analyzers which record signal values over consecutive clock cycles in one time window around a single trigger event. In this way, cycle-accurate waveforms are recorded for one or multiple signals as shown in FIG. 1. This recorded waveforms are stored in a cyclic buffer, wherein the size of the cyclic buffer usually defines the size of the time window which can be recorded, i.e. the number of clock cycles which can be recorded in one window. One of the challenges in this approach is to properly define the triggering event such that the time window covers the part of the signal which is of interest.

SUMMARY OF THE PRESENT DISCLOSURE

It may be seen as an object of the present disclosure to improve signal probing of signals generated by emulated digital circuits emulated by hardware emulation devices.

This object is solved by the subject-matter of the independent claims. Further advantages and embodiments are described in the dependent claims, the description and the figures.

According to a first exemplary aspect of the present disclosure, a method of recording signal values of a first signal generated by an emulated digital circuit emulated by a hardware emulation device can be provided. The exemplary method comprises reading out the first signal which comprises a plurality of data units, which step shall also be denoted as step S1. Furthermore, the method comprises storing at least two signal values of the first signal in a data buffer, wherein each signal value is only stored, if a predetermined recording condition is fulfilled, such that a non-continuous set of signal values is stored in the data buffer. This step shall also be denoted as step S2. Moreover, the method comprises marking at least one of the stored signal values with a flag, if said at least one signal value is a boundary of a data unit of the first signal, which step shall also be denoted as step S3. In other words, the predetermined recording condition may be fulfilled for the at least two signal values.

According to an exemplary embodiment of the present disclosure, a method for content adaptive signal probing can be provided. Instead of probing continuous time windows, the exemplary method records signal values, e.g., only if a predetermined recording condition is fulfilled, for example, only in those clock cycles for which the predetermined recording condition is fulfilled. For example, the recording condition may be fulfilled when the signal values are valid. Thus, the skilled person would understand that signal values are only recorded when they are valid. The recording condition can thus be defined as the validity of a signal value.

One exemplary scenario can be, for example, that the address and write data signals of a synchronous SRAM module are only recorded if the chip enable and write enable signals are set simultaneously. In this case, the recording condition would be fulfilled by the simultaneous setting of the chip enable and the write enable signals. Another exemplary scenario can be, for example, that the data and control signals of a system bus are only recorded if the associated valid and accept signals are set simultaneously. In this exemplary case, the recording condition would be fulfilled by the simultaneous setting of the valid and accept signals associated to the system bus.

A selected number of stored signals can be marked with a flag. For example, the flag can be used to identify boundaries of data units that extend over multiple samples of the recorded first signal. In the above example, the system bus data signal can be enhanced by a flag marking the first and/or the last transaction of a burst transfer.

The hardware emulation device can be also known as prototyping environment or emulation environment. The hardware emulation device may comprise one or more field programmable gate arrays (FPGA). The digital circuit, also known as digital design, may be implemented in the hardware emulation device, respectively in the FPGA of the hardware emulation device, such that the digital circuit is emulated by the hardware emulation device. In other words, the hardware emulation device may duplicate the functions of the digital circuit such that also the signals of the digital circuit are duplicated or emulated by the hardware emulation device. Thus, it may be understood that the signals, the signal values and the digital circuits may be emulated entities emulated by the hardware emulation device. The presented method may be carried out by the hardware emulation device itself. Thus, the method may be implemented in the hardware emulation device or the FPGA of the hardware emulation device, respectively.

It can be further understood that the first signal and also other signals, for example, the second and third signal, each are a set of signals, respectively. For example, the first signal and/or other signals may be a signal of a bus or a system bus. Moreover, the first signal, the second signal and/or the third signal may refer the same signal or the same set of signals. It can also be the case that the second signal and/or the third signal are a subsignal of the first signal, respectively. Also other constellations of signals and subsignals are possible. The first signal and/or other signals, for example the second and third signals, may be generated by an emulated logical element of the emulated digital circuit. The emulated logical element may for example be a register or a logic gate. In the following, it can be understood that the first signal provides sample data. Furthermore, the first signal may also comprise a plurality of subsignals which are read out and whose values are stored if the recording condition is fulfilled. These read out or monitored subsignals may belong to the same clock domain of the digital circuit.

It can further be understood that by reading out the first signal the first signal can be received and processed, for example, by a probe recording unit of a signal probing device described herein. Thus, the first signal can be monitored. The first signal may comprise a plurality of data units, for example, data packets. In particular, the first signal may be divided or partitioned into data units, e.g. data packets, in communication interfaces, or bursts in a system bus interface. Each data unit may comprise boundaries, for example a beginning and an end. The contents of each data packet and the sequence of operations carried out by the set of data signals bearing the data packet may be commonly defined by communication protocols or interface specifications.

Under marking at least one of the stored signal values with a flag, it is possible that a flag can be added to the data record corresponding to the signal value that is a boundary of the data unit of the first signal. Thus, the flag can denote the data record which is a boundary of a data unit, for example a beginning and/or an end of the data unit. The flag may also refer to a separate data record. For example, the marking condition of each data unit may be decoded from the third data signal as described further below.

In the context of exemplary embodiments of the present disclosure, e.g., by storing a signal value a data record or signal record, respectively, is created, e.g., in the data buffer. Thus, by storing the at least two signal values of the first signal, two data records or signal records may be created in the data buffer. For example, the signal values can be recorded. Moreover, the signal values can be stored in such a way that one record per design clock is created in a data buffer, e.g. a first-in-first-out data buffer (FIFO), whenever the recording condition can be fulfilled. The data buffer or FIFO may be integrated in the hardware emulation device or the FPGA, respectively.

With the exemplary embodiments of the method according to the present disclosure, a non-continuous set of signal values can be stored in the data buffer, since each signal value is, e.g., only stored if the predetermined recording condition is fulfilled. Thus, the exemplary provided method can differ from known approaches in that, e.g., it does not automatically record a time window around one single triggering event but stores a plurality of non-continuous signal values, each time a recording condition is fulfilled. Thus, the exemplary method can store a non-continuous set of signal values. In some exceptional cases, however, the signal values can also be continuously stored, for example, if the recording condition is continuously fulfilled during a certain time frame. In this exemplary way, the amount of recorded signal values or probed data to be stored and uploaded for further analysis can significantly be reduced.

By marking stored signal values with a flag indicating a boundary of a data unit, the method provides the capability to correlate the timing between different captured channels. Moreover, higher-level data representations, e.g. memory write protocols, bus transaction protocols, can implicitly be recovered. During later evaluation of the recorded data signal, the marking flag can simplify the identification of the intrinsic structure of the data signal for both, the user of this invention and automatic data analysis methods. The presence of the marking flag significantly speeds up the debug analysis of the recorded data, because the data can be analyzed on a data unit by data unit basis, instead of data cycle by data cycle basis.

According to a further exemplary embodiment of the present disclosure, the method further comprises evaluating whether the recording condition is fulfilled, which can be referred to as step/procedure S4 in FIG. 3.

This exemplary step/procedure S4 can also be carried out by the hardware emulation device or the FPGA, respectively. For example, the step/procedure S4 may be carried out by a recording condition decoder unit of a signal probing device.

One exemplary implementation of step/procedure S4 may be in form of a lookup table. The input to the lookup table may be the second signal. The lookup table may store a bit for each possible signal value, each bit indicating whether the signal value fulfills the recording condition. For example, this lookup table may be loaded during the configuration of the hardware emulation device.

According to a further exemplary embodiment of the present disclosure, the method further comprises the step of reading out a second signal generated by the emulated digital circuit, which can be referred to as step/procedure S5 in FIG. 3. Furthermore, the method comprises the step of evaluating whether the second signal fulfills the recording condition, also can be denoted as step/procedure S6 in FIG. 3. Moreover, the method comprises the step of generating a record enable signal only if the second signal fulfills the predetermined recording condition, also can be referred to as step/procedure S7 in FIG. 3.

For example, the second signal, which may also be denoted as control signal, can be read out by a recording condition decoder unit carrying out the steps/procedures S5, S6 and S7 in FIG. 3. In the context of the present disclosure, the recording condition decoder unit may also be denoted as valid trigger decoder. It may thus be understood that the second signal is used to decode whether the recording condition is fulfilled or not. The second signal may belong to the same clock domain as the first signal.

Moreover, the exemplary method may comprise sending the record enable signal from the recording condition decoder unit to the probe recording unit, only if the second signal fulfils the predetermined recording condition. Additionally, the exemplary method may also comprise receiving the record enable signal by the probe recording unit and storing the data value, only if the record enable signal is received.

According to a further exemplary embodiment of the present disclosure, the method further comprises marking each stored signal value with an information containing a number of preceding data cycles of the signal that have not been stored before the stored signal value. This step can be referred to as step/procedure S8 in FIG. 4.

In this way, the presented method is capable of keeping track of gaps in the stored or sampled signal values. For example, each stored signal value, i.e. each record in the data buffer, may be extended with a saturating counter denoting the number of invalid cycles since the last sampled signal value.

One exemplary application scenario of this exemplary embodiment can be to debug faults in the emulated digital design. With the gap information, the user of the present disclosure is able to associate observed faulty signal values to certain operating conditions of the emulated digital design. For example, if a valid-accept based data handshake is implemented in the design and the design contains a fault that occurs whenever the accept signal is lowered within a data transaction the gap information may be the key distinguishing property between the working and the non-working data transfer.

According to a further exemplary embodiment of the present disclosure, the method further comprises reading out a third signal generated by the emulated digital circuit, which can be referred to as step/procedure S9 in FIG. 3. Moreover, the method comprises the step of evaluating whether the third signal fulfills a predetermined marking condition, also denoted as step/procedure S10. The method further comprises storing a timestamp if the marking condition is fulfilled, also denoted as step/procedure S11 in FIG. 3.

The steps/procedures S9 and S10 may be carried out by a marking condition decoder unit. The timestamp may for example be an entry which is added to a stored signal value, i.e. to a data record. Alternatively, the timestamp may be added as a separate record in the data buffer. The timestamp may at the same time be the flag denoting the boundary of the data unit. In other words, the boundaries of data units may be flagged or denoted by means of timestamps.

The exemplary value of a timestamp can be generated from a counter which increments with every cycle of a reference clock with a known frequency. By knowing the reference clock frequency and the real world time of the counter initialization, the timestamp can be used to deduce the actual real world time at which the signal value is stored, i.e. the data record is created.

In this exemplary way, the stored signal values may be correctly associated to the real world time. The timestamp can, for example, be generated if the third signal comprises a special signal value, for example, a flag marking a boundary of a data unit. In this way, the generation of a timestamp is triggered when the boundary of a data unit is received. Thus, whenever the marking condition decoder unit detects the beginning or end of a data unit, it may generate a timestamp record. A timestamp can thus be associated to the start or the end of a data unit, depending on the availability of the special signals. Alternatively, timestamps may also be generated together with each stored signal value, i.e. with every data record.

For example, each timestamp can be associated to the preceding stored signal values (data records) up to the previous timestamp or the beginning of the record. Alternatively, each timestamp can be associated to the succeeding data records up to the next timestamp or the end of the record.

The third signal can be used to decode a timestamp trigger condition. Thus, the third signal can trigger the generation and record of a timestamp. The third signal may belong to the same clock domain as the first signal and/or the second signal.

According to a further exemplary embodiment of the present disclosure, the method comprises transmitting all signal values stored in the data buffer to a memory unit/device which is located outside of the hardware emulation device while reading out the first signal. This step/procedure may also be denoted as step/procedure S12.

For example, the stored signal values can be transmitted to the memory unit during the emulation of the digital circuit.

The exemplary memory unit/device may in other words be an external memory unit/device or an intermediate storage media, e.g. an internal block RAM or a DDR RAM. Furthermore, the signal values transmitted or uploaded to the memory unit may be removed from the data buffer such that storage space is created for storing new signal values in the data buffer. In this exemplary way, the storage capacity in the data buffer can be increased for long-term observation.

The memory unit/device can comprise multiple input channels to connect to multiple probe recording units of a signal probing device. Furthermore, the memory unit may comprise an output channel, e.g. exactly one output channel, to upload data records to a computer system.

According to a further exemplary embodiment of the present disclosure, the exemplary method comprises discarding a stored signal value and/or a stored timestamp.

For example, a signal record or a timestamp record in the data buffer may be discarded by the signal probing device. This may for example be the case if data records occur faster than they can be stored in the external memory or be transmitted to a computer system such that the data buffer may not be capable of storing each signal value. In such exemplary case, such some signal values can be dropped selectively. Furthermore, the exemplary method may comprise recording quantitative or temporal information about the discarded signal records and timestamp records. For example, the quantitative information can be a loss report record stored in the data buffer, which is stored whenever signal records or timestamp records are lost. The loss report record can, for example, contain the timestamps of the first and last lost signal record, the number of the lost signal records, and/or the number of lost timestamp records.

For example, as the exemplary signal probing device described herein may comprise several independent signal probe channels, the peak record data rate may exceed the available upload data rate or even the right bandwidth into the memory unit. Thus, the signal probing device can be configured to discard or drop signal probe records or timestamp records stored in the data buffer, for example, because data records cannot be written at the speed of their recording or because the probe memory is temporarily full. In this exemplary way, the exemplary method can be configured to perform loss handling such that the exemplary signal probing device carrying out the exemplary method can comprise a built-in loss handling unit/device.

According to another exemplary embodiment of the present disclosure, no further selection of any of the stored data values is performed for the transmission of all signal values stored in the data buffer to the memory unit. In this way, a single stage trigger mechanism is provided which results in a more natural usage. For example, a closer correspondence to actual data valid signaling may be provided.

According to still another exemplary embodiment of the present disclosure, the method can comprises transmitting the signal values stored in the data buffer and/or the memory unit to a computer system that is also located outside of the hardware emulation device while reading out the first signal. This exemplary step/procedure can also be denoted as step/procedure S13.

For example, the data records can be uploaded or upstreamed to the computer system in such a way that the upload operation is decoupled from the rest of the operations at the available upload bandwidth. Since the stored signal values, which correspond to boundaries of data units, are marked with a respective flag, the computer system is able to correlate different channels. Furthermore, e.g., there is no need to provide a further logic in the hardware emulation device which establishes the correlations between different channels of the digital circuit. In this exemplary way, storage space in the data buffer and/or the memory unit may be freed such that the storage capacity is increased for long-term observations.

According to a further exemplary embodiment of the present disclosure, a method of recording a plurality of signal probe channels of an emulated digital circuit can be provided which can be emulated by a hardware emulation device. In particular, each signal probe channel can transmit a respective first signal. According to this exemplary embodiment, the method described herein can be applied to each signal probe channel of the plurality of signal probe channels.

For example, several probe channels can be observed in parallel. Moreover, for each probe channel, independent respective first signals can be read out and independent respective second and third signals can be used for generating respective record enable signals and respective timestamps.

Each channel may correspond to a separate design clock domain. The probed respective first signals of each channel can be transferred to the master clock domain. Furthermore, multiple signal values and/or timestamps, i.e. records, may be collected into record packets by a packing and buffering unit. These record packets from different probe channels can then be stored in one central memory unit or in separate memory units. The records from different signal probe channels can, e.g., be stored in separate memory spaces of the central memory unit. Furthermore, the records can also be extended with a tag denoting the originating signal probe channel and then be stored in a consecutive order in a common memory unit.

According to a further exemplary embodiment of the present disclosure, each signal probe channel can be assigned a priority. In this exemplary way, records from less relevant channels may be dropped first, if the dropping of records is necessary. The priority of the signal probe channels can be assigned at run time to support different debug scenarios.

According to yet further exemplary embodiment of the present disclosure, each signal probe channel can run in a mode where only parts of data units are recorded. For example, only the first n records after the first record of a data unit, i.e. the record marked with a respective flag, may be recorded. This partial recording of data unit/device can be carried out when data units extend over many consecutive clock cycles. In this way, a significant extension of capability of real-time high-speed observations due to built-in elimination of irrelevant data cycles may be provided.

According to another exemplary embodiment of the present disclosure, the exemplary method can be carried out by a signal probe device implemented into the hardware emulation device.

According to still another exemplary embodiment of the present disclosure, the method comprises implementing the signal probing device in the hardware emulation device. The exemplary implementation can be carried out by a computer system that is configured for implementing the signal probing device into the hardware emulation device.

A second exemplary aspect of the present disclosure relates to a computer program that resides in or on a computer-accessible medium, which, when it is executed by a processor of a computer system comprising a hardware emulation device, causes the hardware emulation device to carry out the exemplary embodiment of the method of the present disclosure described herein.

This exemplary program can, for example, be executed by the processor while implementing a digital circuit into the hardware emulation device. In this exemplary way, the signal probing device is implemented into the hardware emulation device at the same time as the digital circuit.

Moreover, the present disclosure may also relate to a computer program product, e.g., to a memory unit, on which said program element is stored.

Another exemplary aspect described in the context of the present disclosure relates to a signal probing device for recording signal values of a first signal generated by an emulated digital circuit emulated by a hardware emulation device. The signal probing device comprises a probe recording unit and a data buffer. The probe recording unit can be configured for reading out the first signal. Furthermore, the probe recording unit is configured for storing at least two signal values of the first signal in the data buffer. Moreover, the probe recording unit can be configured to store each signal value only if the probe recording unit detects that a predetermined recording condition is fulfilled, such that a non-continuous set of signal values is stored in the data buffer. Additionally, the probe recording unit can configured for marking a signal value stored in the data buffer with a flag, if said signal value is a boundary of a data unit of the first signal.

For example, the exemplary signal probing device or units of the exemplary signal probing device can be configured for carrying out any method step described in the context of the present disclosure.

The exemplary signal probing device can at least partially be implemented in the hardware emulation device, which emulates the emulated digital circuit.

As described herein for exemplary method, the signal probing device can be configured for reading out or probing a plurality of different signal probe channels. Thus, the signal probing device can comprise a probe recording unit for each read out or signal probe channel. Furthermore, the signal probing device can comprise a packing and buffering unit for each probed signal probe channel. The records of each signal probe channel can be stored in the same data buffer. The record packets of each signal probe channel can be stored in a central data buffer or in separate data buffers. For example, the signal records from different signal probe channels can be stored in separate memory spaces of a data buffer. Alternatively, the records can also be extended with a tag denoting the originating signal probe channel and then be stored in consecutive order in a common memory space of the data buffer.

The exemplary signal probing device can also comprise an autonomous upload unit/device which can be configured to transfer signal probe records for further processing to a computer system. The upload unit/device can be configured to run decoupled from the rest of the operations at the available upload bandwidth.

According to a further exemplary embodiment of the present disclosure, the signal probing device further comprises a recording condition decoder unit/device. For example, such recording condition decoder unit/device can be configured for reading out a second signal generated by the emulated digital circuit. The recording condition decoder unit/device can further be configured for evaluating whether the second signal fulfills the predetermined recording condition. The recording condition decoder unit/device can further be configured for generating a record enable signal only if the second signal fulfills the predetermined recording condition.

According to a further exemplary embodiment of the present disclosure, the signal probing device comprises a marking condition decoder unit/device. The marking condition decoder unit/device can be configured for reading out a third signal generated by the emulated digital circuit. Furthermore, the marking condition decoder unit/device can be configured for evaluating whether the third signal fulfills a predetermined marking condition. Moreover, the probe recording unit/device can be configured for storing the timestamp in the data buffer if the marking condition is fulfilled.

The exemplary embodiments of the present disclosure are described with reference to different subject-matter. In particular, in a section including the claims, some exemplary embodiments are described with reference to method type claims, whereas other embodiments are described with reference to apparatus type claims. However, a person skilled in the art will gather from the above and the following description that, unless otherwise notified, in addition to any combination of features belonging to one type of subject-matter also any combination between features relating to different subject-matters is considered to be disclosed within the present disclosure.

The exemplary procedures and/or step of the exemplary methods described in the context of the present disclosure can be carried out in the described order, in another order or parallel to each other. By way of an example, without having any limiting effect, step/procedure S1 can be carried out in parallel to steps/procedures S5 to S7 and/or in parallel to steps/procedures S9 and S10.

The aspects described above and further aspects, features and advantages of the present disclosure may also be found in the exemplary embodiments which are described in the following with reference to the appended drawings and claims.

BRIEF DESCRIPTION OF THE DRAWINGS

Further objects, features and advantages of the invention will become apparent from the following detailed description taken in conjunction with the accompanying figures showing illustrative embodiments of the present disclosure.

FIG. 6 shows an illustration of another set of probe records according to another exemplary embodiment of the present disclosure.

FIG. 7 shows a graph of probe records of different channels according to still another exemplary embodiment of the present disclosure.

FIG. 8 shows a graph of a first signal, which comprises gaps, during which no record is stored, according to an exemplary embodiment of the present disclosure.

FIG. 9 shows an illustration of records comprising an information containing a number of preceding data cycles of the signal that have not been stored according to an exemplary embodiment of the present disclosure.

Figure 1:
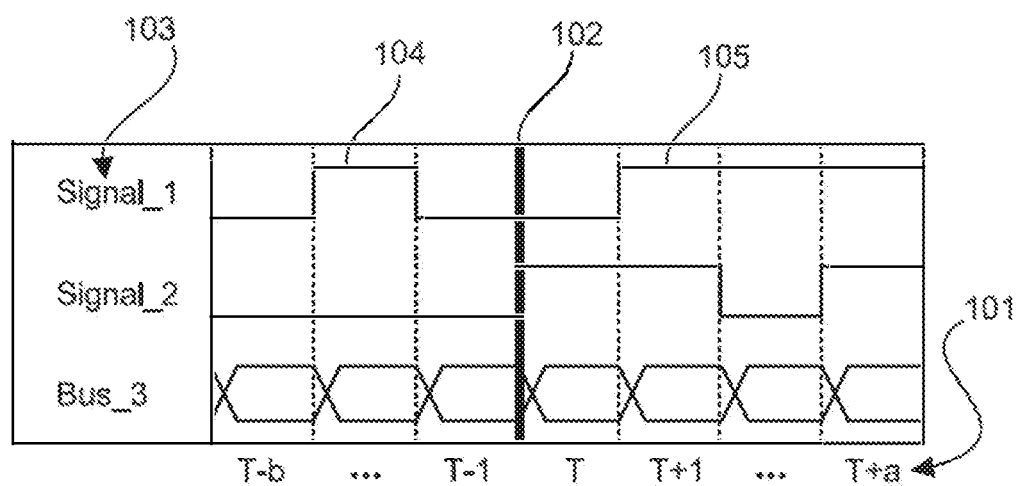
FIG. 1 shows a signal diagram of a conventional signal probe over consecutive clock cycles in one time window around a single triggering event.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

FIG. 1 shows a graph of a conventional record of a probed signal 103. Conventionally, signal probing is triggered by one single triggering event 102, which triggers the recording of a certain number of consecutive clock cycles in a time window. The a+b+1 consecutive clock cycles T−b to T+a are denoted in x-direction 101. Thus, b clock cycles before the triggering event 102 and a+1 clock cycles after the triggering event 102 are probed. The probed signal comprises a signal part 104, which is probed before the triggering event 102 and a signal part 105 which is probed after the single triggering event 102.

Figure 2:
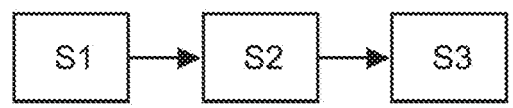
FIG. 2 shows a flow diagram of a method according to an exemplary embodiment of the present disclosure.

FIG. 2 shows a flow diagram of a method of recording signal values of a signal generated by an emulated digital circuit emulated by a hardware emulation device according to an exemplary embodiment of the present disclosure. The exemplary method comprises the step/procedure S1 for reading out the signal which comprises a plurality of data units, the step/procedure S2 for storing at least two signal values of the signal in a data buffer and the step/procedure S3 for marking at least one of the stored signal values with a flag, if such at least one signal value is a boundary of a data unit of the signal. For example, step/procedure S2, is only carried out for signal values, for which a predetermined recording condition is fulfilled, such that a non-continuous set of signal values is stored in the data buffer.

Figure 3:
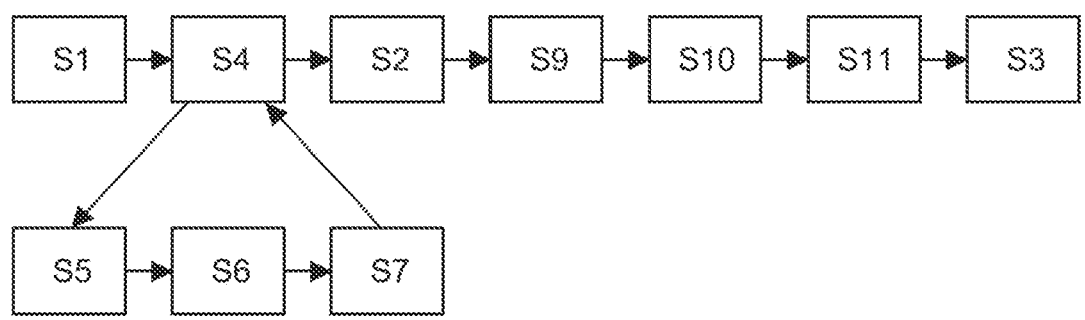
FIG. 3 shows a flow diagram of the method according to a further exemplary embodiment of the present disclosure.

FIG. 3 shows a flow diagram a method of recording signal values of a signal generated by an emulated digital circuit emulated by a hardware emulation device according to a further exemplary embodiment. Step/procedure S1 of the exemplary method illustrated in FIG. 3 comprises reading put the signal, which comprises a plurality of data units. The method further comprises step/procedure S4 for evaluating whether a recording condition is fulfilled. This evaluation can, for example, be performed by carrying out steps/procedures S5, S6 and S7. In step/procedure S5, a second signal generated by the emulated digital circuit can be read out. In step/procedure S6, it is evaluated whether the second signal fulfills a predetermined recording condition. In step/procedure S7, a record enable signal can be generated only if the second signal fulfills the predetermined recording condition. In this case, the recording condition is fulfilled by the record enable signal. Thus, e.g., only if the record enable signal is generated, step/procedure S2 of storing at least two signal values of the signal in a data buffer is carried out. Furthermore, the exemplary method shown in FIG. 3 comprises step/procedure S9 for reading out a third signal generated by the emulated digital circuit, step/procedure S10 for generating the timestamp on the basis of the third signal and step/procedure S11 for storing the timestamp. In step/procedure S3, at least one of the stored signal values is marked with a flag, if such at least one signal value is a boundary of a data unit of the signal. For example, the flag can be the timestamp.

Furthermore, the exemplary methods of FIGS. 2 and 3 can also comprise marking each stored signal value with a record indicating a number of preceding data cycles of the signal that had not been stored before the stored signal value. The exemplary methods can also comprise transmitting all signal values stored in the data buffer to a memory unit/device which is also located outside of the hardware emulation device while reading out the first signal and the step of transmitting the signal value stored in the data buffer or the memory unit/device to a computer system that is also located outside of the hardware emulation device while reading the first signal.

The procedures of the exemplary methods described in the context of the present disclosure can be carried out in the described order, in another order or parallel to each other. For example, step/procedure S1 (e.g., reading out the first signal) can be carried out in parallel to steps S5 (reading out the second signal), step/procedure S6 (e.g., evaluating whether the second signal fulfills the predetermined recording condition), step/procedure and S7 (e.g., generating a record enable signal only if the second signal fulfills the predetermined recording condition) as well as in parallel to s step/procedure S9 (e.g., reading out a third signal) and step/procedure S10 (e.g., evaluating whether the third signal fulfills a predetermined marking condition). Furthermore, also the steps/procedures of initializing a timestamp and of auto-incrementing the timestamp can be carried out in parallel to step/procedure S1.

Figures 4, 5:
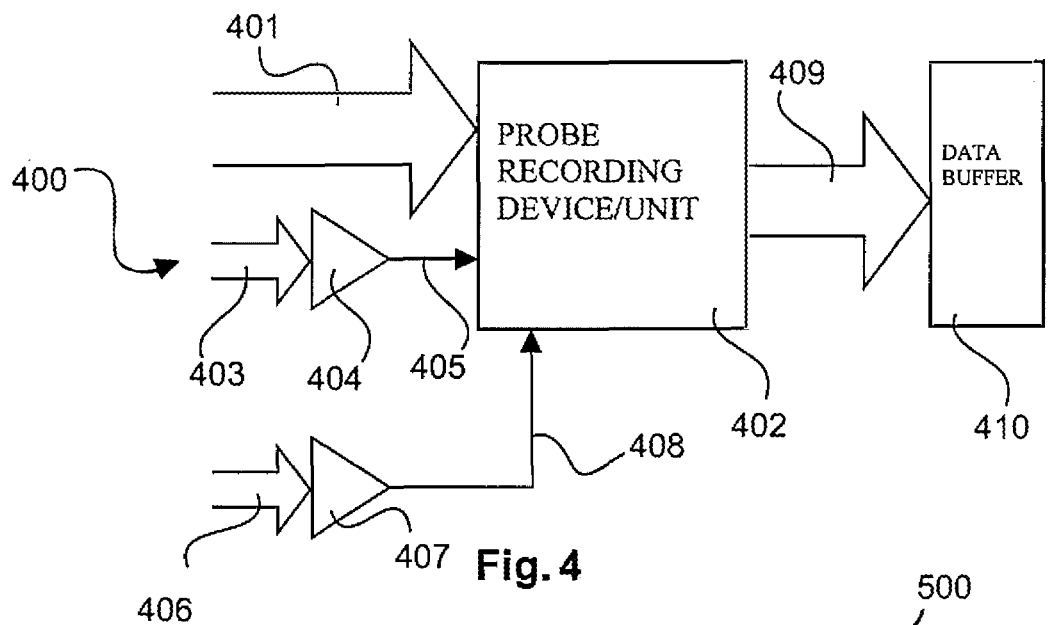
FIG. 4 shows a block diagram of a probe recording unit/device according to a further exemplary embodiment of the present disclosure.
FIG. 5 shows an illustration of a set of probe records according to a further exemplary embodiment of the present disclosure.

FIG. 4 shows a diagram of a signal probing device 400 according to an exemplary embodiment of the present disclosure. The exemplary signal probing device 400 comprises a probe recording unit 402 and a data buffer 410. The probe recording unit/device 402 can be configured for reading out a first signal 401 generated by an emulated digital circuit emulated by a hardware emulation device. Furthermore, the probe recording unit/device 402 can be configured to store each signal value of the first signal 401 only if the probe recording unit/device 402 detects that a predetermined recording condition is fulfilled, such that a non-continuous set of signal values is stored in the data buffer 410.

For example, the signal probing device 400 comprises a recording condition decoder unit 404 that is configured for reading out a second signal 406 generated by the emulated digital circuit. The recording condition decoder unit/device 404 is configured for evaluating whether the second signal fulfills the predetermined recording condition and for generating a record enable signal 405, only if the second signal 403 fulfills the predetermined recording condition. In this exemplary case, the recording condition is fulfilled by the record enable signal 405 and the probe recording unit/device 402 is configured for storing the signal value in the data buffer 401, only if it receives the record enable signal 405. Thus, the triggered signal value 409 is stored in the data buffer 410 such that a signal record is created in the data buffer.

Furthermore, the exemplary signal probing device 400 can comprise a marking condition decoder unit/device 407 which is configured for reading out a third signal 406 generated by the emulated digital circuit. The marking condition decoder unit/device 407 can be configured for generating a timestamp 408 on the basis of the third signal, for example if the marking condition decoder unit is triggered by the third signal. The probe recording unit/device 402 can then be configured for storing the timestamp in the data buffer 410. The stored timestamp may be a separate record in the data buffer 410 or may extend a record of a signal value.

FIG. 5 illustrates a set of exemplary records 500 recorded by a signal probing device 400 shown in FIG. 4 is shown according to an exemplary embodiment of the present disclosure. For example, each stored record comprises several entries, including a record number 501, a record type 502, a signal value of a first sub-signal 503 of a first signal, a signal value of a second sub-signal 504 of the first signal, a value of a bus 505 of the first signal, and a flag indicating whether the record is a boundary of a data unit 506. It can thus be seen that the records 1 and N are flagged as being a boundary of a data unit. Moreover, the field Type 502 of all records is "probe" indicating that each record is a signal probe, respectively.

FIG. 6 illustrates another set of stored records 600 recorded by a signal probing device 400 shown in FIG. 4 is presented according to another exemplary embodiment of the present disclosure. For example, the stored records comprise several entries, i.e., a record number 601, a record type 602, and values of a first sub-signal 603, a second sub-signal 604, and a bus 605 of the first signal, respectively. Furthermore, the stored records comprise stored timestamps, where each stored timestamp 606 and 607 is a separate record. The stored signal probes can have the record type 602 "probe" indicating that said records are probe records. The stored timestamps 606 and 607 can have the record type 602 "first" or "last", respectively, denoting that the timestamp 606 represents the beginning of a data unit and that the timestamp 607 represents the end of a data unit.

FIG. 7 shows a graph of recorded signal probes of different channels 702 as a function of time 701, according to an exemplary embodiment of the present disclosure. For example, in FIG. 7, it is shown that records or channel 1 are stored for a first data unit/device 703 and that the first and last record of the data unit/device 703 is marked with a flag and/or timestamp indicating the beginning and end of the data unit. Furthermore, it is shown that a data unit/device 706 is stored for channel 2 and that the end of the data unit/device 706 is marked with a flag and/or timestamp. For channel 3, a data unit/device 707 is stored and the beginning of the data unit/device 707 is marked with a respective flag and/or timestamp. For channel 4, data units are stored such that every valid data cycle 708 has a timestamp.

In FIGS. 8 and 9, the handling of gaps in the sampling of a first signal 801 is shown. For example, FIG. 8 shows a graph of a first signal 801 and a first record enable signal 802, in which only data values 804, 806, 807 and 808 are stored when the record enable signal 802 is high such that gaps 803 and 805 occur before the signal values A and B, respectively. FIG. 9 illustrates a respective set of exemplary records 900. For example, each exemplary record comprises several entries, i.e., a record number 901, an entry indicating the number of unrecorded data cycles since the last recorded signal value 902, and an entry relating to the recorded signal value 903. Corresponding to FIG. 8, the entry 902 of record A indicates that a maximal number of data cycles before the record A has not been recorded. In other words, record A is the first stored record. Furthermore, the entry 902 of record B indicates that three data cycles before record B have not been recorded. For records C and D, the entry 902 is equal to zero since no gap occurs before records C and D.

Figure 10:
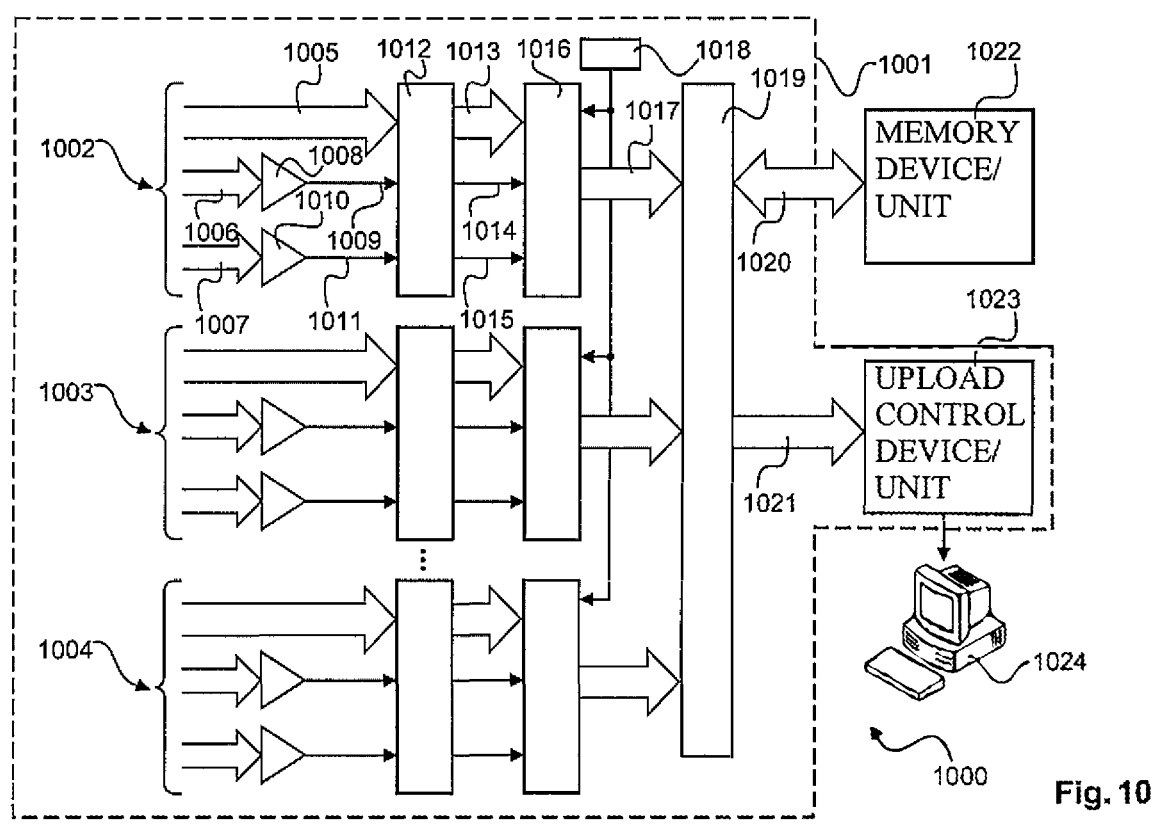
FIG. 10 shows a diagram of a probe recording device according to an exemplary embodiment of the present disclosure.

FIG. 10 shows a diagram of a signal probing system 1000 according to an exemplary embodiments of the present disclosure. The exemplary signal probing system 1000 comprises a signal probing device 1001. The signal probing device 1001 can be implemented in a hardware emulation device, for example, in a FPGA. Furthermore, the signal probing system comprises a memory unit 1022, e.g. a RAM, and a computer system 1024.

The signal probing device 1001 can be configured for probing a plurality of channels 1002, 1003 and 1004. For the first channel 1002, the signal probing device 1001 comprises a probe recording unit/device 1012, which is configured for reading out a first signal 1005 of the channel 1002. Furthermore, the signal probing device 1001 comprises a first recording condition decoder unit 1008 for the first channel 1002 which is configured for reading out a second signal 1006 of the first channel 1002 and for generating a record enable signal 1009, only if the recording condition decoder unit/device 1008 determines that the second signal 1006 fulfills a predetermined recording condition. Furthermore, the signal probing device 1001 comprises a marking condition decoder unit 1010 for the first channel 1002, which marking condition decoder unit 1010 is configured for reading out a third signal 1007 of the first channel 1002. The marking condition decoder unit/device 1010 is configured for generating a timestamp 1011 based on the third signal 1007. The probe recording unit 1012 is then configured to direct a signal value 1013, the record enable signal 1014, and the timestamp 1015 to a record packing and buffer unit 1016, which record packing and buffering unit is configured for collecting multiple probe signal cycles and timestamps into record packets 1017. The record packets of several channels are then stored in a central data buffer 1019.

The same also applies for the other channels 1003 and 1004.

The signal probing device 1001 can further comprise a timestamp counter 1018 which sends a signal to each packing and buffering unit/device 1016 of each channel 1002, 1003 and 1004.

The signal probing device 1001 can further comprise an upload control unit/device 1023 for controlling data upload to the computer system 1024. The central data buffer 1019 can be configured to transmit the stored records 1021 to the upload control unit, which uploads the records 1021 to the computer system 1024 during the emulation of the digital circuit. The computer system 1024 can be used for evaluating the stored records and for implementing the digital circuit and the signal probing device 1001 in the hardware emulation device.

Furthermore, the signal probing system 1000 can comprises a memory unit/device 1022, which may be arranged separately to the signal probing device 1001 or may be integrated in the signal probing device 1001. The signal probing device 1001 can be configured for transmitting the stored records 1020 from the data buffer 1019 to the memory unit/device 1022 during the emulation of the digital circuit.

Whilst the present disclosure has been illustrated and described in detail in the drawings and in the foregoing description, such illustration and description are to be considered illustrative or exemplary and non-restrictive. The present disclosure is not limited to the disclosed embodiments. Other variations to the disclosed embodiments can be understood and effected by those skilled in the art in practicing the claimed subject matter, from a study of the drawings, from the disclosure, and from the appended claims. In the claims, the word "comprising" does not exclude other elements, procedures or steps and the indefinite article "a" or "an" does not exclude a plurality.

The invention claimed is:

1. A method for recording signal values of a signal generated by an emulated digital circuit emulated by a hardware emulation device, comprising:

reading out the signal which comprises a plurality of data units;

storing at least two signal values of the signal in a data buffer;

marking one of the stored signal values with a flag, if the one of the one signal values is a boundary of a data unit of the signal; and evaluating whether a predetermined recording condition is fulfilled, wherein each of the signal values is stored whenever the predetermined recording condition is fulfilled regardless of a detection of a triggering event so as to store a non-continuous set of the signal values in the data buffer.

2. The method according to claim 1, further comprising marking each of the stored signal values with information containing a particular number of preceding data cycles of the signal that have not been stored before the stored signal values.

3. The method according to claim 1, further comprising:
reading out a further signal generated by the emulated digital circuit;
evaluating whether the further signal fulfills a predetermined marking condition; and
storing a timestamp if the predetermined marking condition is fulfilled.

4. The method according to claim 1, further comprising, while reading out the signal, transmitting all of the signal values stored in the data buffer to a memory device which is located outside of the hardware emulation device.

5. The method according to claim 4, wherein no further selection of any of the stored data values is performed for the transmission of all of the signal values stored in the data buffer to the memory device.

6. The method according to claim 5, further comprising, while reading out the signal, transmitting the signal values stored in at least one of the data buffer or the memory device to a computer system that is located outside of the hardware emulation device.

7. The method according to claim 1, wherein the method is performed by a signal probing device implemented in the hardware emulation device.

8. The method according to claim 7, further comprising implementing the signal probing device in the hardware emulation device.

9. The method according to claim 1, wherein the signal is stored after the signal is read out.

10. The method according to claim 1, wherein the signal further comprises at least one of an address or a write data signal of a synchronous SRAM module, and wherein the predetermined recording condition is fulfilled whenever a chip enable signal and a write enable signal of the synchronous SRAM module are set simultaneously.

11. The method according to claim 1, wherein the signal comprises at least one of data or a control signal of a system bus, and wherein the predetermined recording condition is fulfilled whenever a valid and accept signal of the system bus are set simultaneously.

12. The method according to claim 1, further comprising:
preventing marking of the other one of the store signal values without the flag, if the other one of the store signal values is not the boundary of the data unit of the signal.

13. A method for recording a plurality of signal probe channels of an emulated digital circuit which is emulated by a hardware emulation device, each of the signal probe channels transmitting a respective signal, the method comprising:

a) reading out the signal which comprises a plurality of data units;
b) storing at least two signal values of the signal in a data buffer;
c) marking at least one of the stored signal values with a flag, if the at least one of the signal values is a boundary of a data unit of the signal;
d) evaluating whether a predetermined recording condition is fulfilled, wherein each of the signal values is stored whenever the predetermined recording condition is fulfilled regardless of a detection of a triggering event so as to store a non-continuous set of the signal values in the data buffer; and
(e) repeating procedures (a)-(c)) for each of the signal probe channels.

14. The method according to claim 13, wherein the method is performed by a signal probing device implemented in the hardware emulation device.

15. The method according to claim 14, further comprising implementing the signal probing device in the hardware emulation device.

16. The method according to claim 13, wherein the signal is stored after the signal is read out.

17. A non-transitory computer-accessible medium storing a computer program thereon or therein for recording signal values of a signal generated by an emulated digital circuit emulated by a hardware emulation device, which, the computer program it is executed by a processor of a computer system comprising the hardware emulation device, configures the hardware emulation device to perform procedures comprising:
reading out the signal which comprises a plurality of data units;
storing at least two signal values of the signal in a data buffer;
marking at least one of the stored signal values with a flag, if the at least one of the signal values is a boundary of a data unit of the signal; and
evaluating whether a predetermined recording condition is fulfilled, wherein each of the signal values is stored whenever the predetermined recording condition is fulfilled regardless of a detection of a triggering event so as to store a non-continuous set of the signal values in the data buffer.

18. The non-transitory computer-accessible medium according to claim 17, wherein the signal is stored after the signal is read out.

19. A non-transitory computer-accessible medium storing a computer program thereon or therein for recording a plurality of signal probe channels of an emulated digital circuit which is emulated by a hardware emulation device, each of the signal probe channels transmitting a respective signal, which, the computer program it is executed by a processor of a computer system comprising the hardware emulation device, configures the hardware emulation device to perform procedures comprising:
a) reading out the signal which comprises a plurality of data units;
b) storing at least two signal values of the signal in a data buffer;
c) marking at least one of the stored signal values with a flag, if the at least one of the signal values is a boundary of a data unit of the signal; and
d) evaluating whether a predetermined recording condition is fulfilled, wherein each of the signal values is stored whenever the predetermined recording condition is fulfilled regardless of a detection of a triggering event so as to store a non-continuous set of the signal values in the data buffer
(c) repeating procedures (a)-(c)) for each of the signal probe channels.

20. The non-transitory computer-accessible medium according to claim 19, wherein the signal is stored after the signal is read out.

21. A signal probing device for recording signal values of a signal generated by an emulated digital circuit emulated by a hardware emulation device, the signal probing device comprising:
a probe recording device configured to read out the signal;
a data buffer; and
a recording condition decoder device;
wherein the probe recording device is configured to:
store at least two signal values of the signal in the data buffer whenever the probe recording device detects that whenever a predetermined recording condition is fulfilled regardless of a detection of a triggering event so as to store a non-continuous set of signal values in the data buffer, and
mark a particular signal value of the signal values stored in the data buffer with a flag if the particular signal value is a boundary of a data unit of the signal.

22. The signal probing device according to claim 21, further comprising a marking condition decoder which is configured to:
read out a further signal generated by the emulated digital circuit,
evaluate whether the further signal fulfills a predetermined marking condition, and
store a timestamp in the data buffer if the marking condition is met.

23. The signal probing device according to claim 21, wherein the probe recording device is configured to store the signal after the signal is read out.

* * * * *